United States Patent [19]

Mattson

[11] Patent Number: 4,895,684

[45] Date of Patent: Jan. 23, 1990

[54] CURING OF ARTICLES IN A DOME PRESS AFTER EARLY SHUT-OFF OF STEAM

[75] Inventor: William F. Mattson, Hinckley, Ohio

[73] Assignee: The Uniroyal Goodrich Tire Company, Akron, Ohio

[21] Appl. No.: 285,690

[22] Filed: Dec. 16, 1988

Related U.S. Application Data

[63] Continuation-in-part of Ser. No. 102,956, Sep. 30, 1987, Pat. No. 4,816,198, which is a continuation-in-part of Ser. No. 704,850, Feb. 25, 1985, abandoned.

[51] Int. Cl.⁴ .......................................... B29C 35/02
[52] U.S. Cl. .................... 264/40.6; 264/315; 264/326; 425/40; 425/52
[58] Field of Search ............ 264/40.6, 315, 326, 264/347; 425/40, 41, 52, 50, 51

[56] References Cited

U.S. PATENT DOCUMENTS

| | | | |
|---|---|---|---|
| 2,424,915 | 7/1947 | Bosomworth et al. | 425/40 |
| 2,693,005 | 11/1954 | Briscoe et al. | 425/40 |
| 2,834,984 | 5/1958 | Robbins | 425/40 |
| 3,443,280 | 4/1969 | Hugger | 264/40.6 |
| 3,632,712 | 1/1972 | Miller | 425/40 |
| 3,718,721 | 2/1973 | Gould et al. | 264/40.6 |

*Primary Examiner*—Jan H. Silbaugh
*Assistant Examiner*—Neil M. McCarthy
*Attorney, Agent, or Firm*—Alfred D. Lobo; Alan A. Csontos

[57] ABSTRACT

The heat-sink capacity of a well-insulated dome curing press lends itself to saving external steam (flowed over the exterior of a mold in the press) when curing an article. Despite shutting off the external steam at about the half-way point in the normal heating cycle, or sooner, the temperature swing at a point 2 inches within the mold is less than 10° F. This small swings allows the point of least cure (PLC) to receive the required number of cure equivalents long after the external steam supply is shut off, that is, while the press is "coasting". In the mean while, the internal heating and cooling cycle of the press may also be shortened for maximum energy savings, or left unchanged. Though the external steam is shut off before the PLC has received the required or specified number of cure equivalents at the PLC, the press-open to press-close cycle remains the same, and the quality of the cure is not measurably affected.

3 Claims, 4 Drawing Sheets

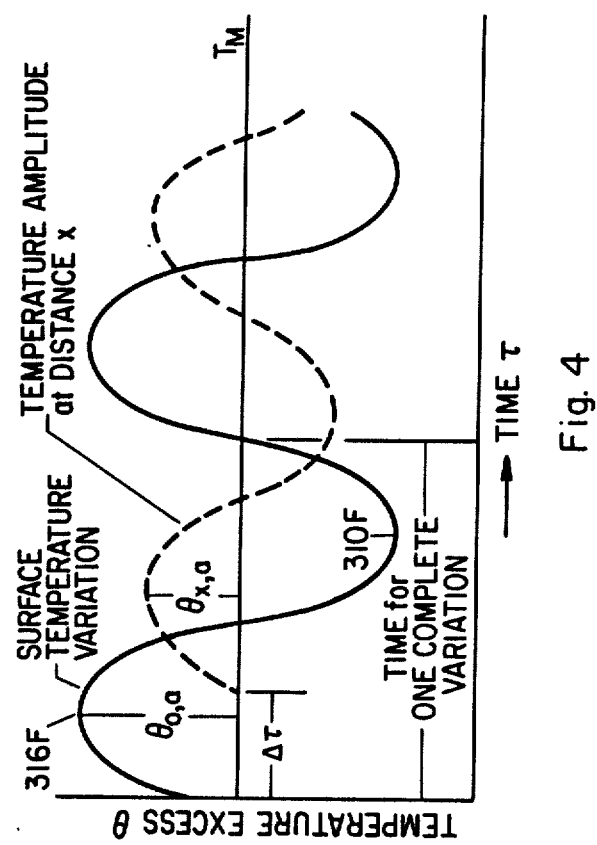

CURING OF ARTICLES IN A DOME PRESS AFTER EARLY SHUT-OFF OF STEAM

BACKGROUND OF THE INVENTION

This application is a continuation-in-part application of Ser. No. 102,956 filed Sept. 30, 1987, now U.S. Pat. No. 4,816,198, which in turn is a continuation-in-part of Ser. No. 704,850 filed Feb. 25, 1985, and now abandoned.

This invention derives from the concept that one can draw on the quantity of heat stored in a large mass, and use the heat drawn to accomplish the task at hand without concurrently replenishing the large mass with the heat drawn. Stated differently, this invention derives from the unexpected discovery that "early shut-off" of steam to a large enough curing press is not premature because it does not substantially affect the quality of the cure which is completed after the early shut-off, and it saves steam.

More particularly, this invention relates to using the large mass of a "dome" curing press at high temperature, and the effective utilization of steam used to heat the exterior surfaces of a mold mounted in the dome press. Such presses are typically used to cure large tires. Commercially available dome presses are typified by the Autoform dome press made by NRM, and the Bag-O-Matic dome press made by McNeil. These presses combine shaping and vulcanization of a previously formed pneumatic tire in one operation in accordance with the so-called Soderquist system. Presses of this type are disclosed in U.S. Pat. Nos. 2,358,762; 2,358,764; 2,775,789 and 2,808,618. The heat for curing may be provided internally by the curing bladder or diaphragm, and externally by the structural mass of the dome press.

In a typical dome press, such as those of the '762 and '789 patents, the curing bladder is collapsed to permit a green tire to be positioned on the lower mold section; the press is then closed and the bladder dilated by steam, thus forcing the green tire into and against the outer periphery of the mold. During the curing period, high pressure steam, or high temperature water under pressure is flowed through the bladder, in conventional operation, until the cure is completed.

The length of the curing cycle depends on the size and mass of the tire being cured, and may be from about 30 min to about 90 min, or more. After the cure is complete, the press opens. On a Bag-O-Matic dome press, the curing bladder may be completely extended mechanically and collapsed by application of vacuum to permit removal of the tire from the mold.

Largely because saving steam was not a substantial concern in the days when the cost of energy was relatively small, it simply never occurred to one skilled in the art, that savings in the amount of heating medium may be realized by shutting off the external heating medium before the cure was completed, and preferably also shutting off the internal heating medium in the bladder before the cure is completed. It is readily conceded that the savings on an early shut-off of the internal medium is relatively small compared to that realized by early shut-off of the external steam.

Further, this invention relates to how one can utilize specific information as to a maximum permissible 10° F swing in temperature, at a location 2 inches within the mold, that is, from the external surface of a mold in a dome press, to trade profitably upon the vast quantity of heat stored within the dome press. The effectiveness of this process derives largely from the high conductivity of a metal mold, usually aluminum, in which a thick-walled article of a curable elastomer is cured under high pressure exerted by a hot fluid. By "thick-walled" I refer to a cross-section of elastomer, usually rubber, such as that provided by a carcass of a large truck tire having a road-contacting tread portion at least about 0.50 inch (about 12 mm) thick. For example, a green (uncured) truck tire carcass is cured (vulcanized) in a twin-mold dome press by heating with a fluid-pressurized bladder inserted within the tire, while the outer surface of the tire is heated by contact with the internal surfaces of an externally heated mold, usually heated with high pressure steam.

More specifically, the invention relates to a process for delivering the optimum number of cure equivalents to an article to be cured, this number of cure equivalents being delivered to the point of least cure (PLC), after either or both of the heat sources is shut-off at least 25% earlier, relative to the time conventionally required to provide the optimum number. Preferably, both the hot pressurized fluid, heating the inner surface of the article, and the steam to the outer surface of the mold, are each shut-off early.

The early shut-off is effected without sensing the temperature at any point within the article while it is being cured, or within, or on the surface of the mold.

A "cure equivalent" is defined as one minute of curing time at a constant reference temperature, usually 280° F. The PLC is so referred to because it is the critical point at which the desired number of cure equivalents is to be delivered. When neither more nor less cure equivalents than optimum are delivered to the PLC, the article is said to have had a "perfect cure". Methods of computing the number of cure equivalents to be delivered, or determining the location of the PLC are known and are only incidental to the present invention.

In my aforementioned copending application Ser. No. 102,956 I utilized the lag time provided by the mass of rubber being cured, rather than that provided by the mass of the dome press. In each case I discontinue flow of the heating medium to the dome press long before the PLC has had the necessary number of cure equivalents delivered to it to effect the cure.

In contrast, a utilization of lag time is made in the curing of a rubberized nylon cord carcass as taught in U.S. Pat. No. 3,718,721 to Gould et al where the mold heating means is rendered inoperative after a cure has been effected. As clearly pointed out in col 5, lines 44-49, a satisfactory state of cure is reached and opening of the press is initiated when the comparison of the measured temperature with the reference temperature of cure and the elapsed time of cure indicates that the state of cure is such that no porosity will develop in the tire upon release of pressure within the press.

Obviously, if the state of cure is such that the tire will "blow" if the pressure is released, the tire will be destroyed. A tire is said to "blow" when its state of cure is such that enough gases (air, and those generated by the vulcanization reaction) are trapped within the rubber to expand the body, often with too great a force to be contained because the rubber is not sufficiently cured. When sufficiently cured, even if the optimum number of cure equivalents is not as yet delivered to the PLC, most of the entrapped gases have escaped through vents in the mold, the matrix of rubber is substantially thoroughly reinforced by virtue of the crosslinking of polymer chains, and releasing the pressure does not produce any visual evidence of porosity in the cured article.

Thus, Gould et al teach that when a predetermined overall change in the total state of cure has been achieved, the computer actuates a valve mechanism which controls the steam supply to shut it off. At such an instant, the computer actuates a mold-opening mechanism and the completed tire is removed (see col 5, lines 13-19). Obviously, if at the instant the mold-opening mechanism is actuated, the temperature at any point in the tire is above that at which the tire will blow, the tire will be destroyed. Even if the mold was not opened, the cold flood could only be initiated after the cure was past the point when porosity would develop when the pressure was released. In other words, the mold could be cold-flooded only after the risk of blowing the tire had abated. This risk was a necessary consequence of having to release pressure, if only instantaneously, to make the change from a steam supply to a cold fluid. It was only upon completion of the change-over that a cold flood could be initiated within the press to cool the tire. In so doing, namely cold flooding the mold immediately upon negating the risk of blowing the tire, they found a way of profitably utilizing that portion of the lag time which allowed stored heat to be utilized to set the nylon cords and minimize distortion of the carcass.

It was essential that the point where porosity would develop be passed before the change-over from saturated steam to cold water, because the sudden change in temperature will necessarily produce too great a drop in the vapor pressure of the saturated steam. If, for example, saturated steam at 200 psig (1479 kPa) and 388° F (198° C) was replaced by water at 100° F (37.8° C) before the rubber was cured to a point where porosity would develop because the rubber was as yet uncured, the pressure drop would be so great that the tire would blow. This is because the steam in the bladder cannot be instantaneously displaced, and the bladder filled with cold water. In reality, it takes some time to displace the steam from the bladder, and to fill the bladder with water. This is not to say that the steam cannot be first displaced by hot water at the same temperature as the saturated steam, so that there is no drop in pressure, the hot water supply in turn, being then displaced by cold water, referred to as a "cold-flood".

As will presently be evident, this invention is unrelated to when a change-over from a hot supply to a cold flood is made. It simply allows one to save on steam consumption by an early shut-off of at least the "external steam", without making any direct measurement of temperature within the curing tire, or at any other location.

The means for tracking the PLC without sensing temperature within the tire is disclosed in U.S. Pat. No. 4,371,483 to Mattson. However, Mattson's interest was sharply focussed upon the problem of mimicing a threedimensional finite difference program to track the PLC without sensing a temperature within the body. Ten years after Gould et al '721, it was up to Mattson '483 to provide an effective curing process without sensing temperature. The process of this invention relies on the time conventionally used for an optimum cure, because it is from this conventional time, that the time for early shutoff is selected.

SUMMARY OF THE INVENTION

It has been discovered that the flow of steam to heat the external surfaces of a mold in a dome press may be shut off before one-half the normal time in the normal curing period has elapsed, and before one-half of the number of cure equivalents required for a complete cure are delivered to the PLC, without increasing the normal press-open to press-close cycle time, and without measurably affecting the quality of the cure; that is, without substantially changing the number of cure equivalents delivered to the point of least cure (PLC) for a complete cure, within the normal, conventional period during which the steam flow would continuously have been maintained.

It is therefore a general object of this invention to provide a process for "coasting" a dome press in an "external steam-off" mode for from about 25% to about 75% of the normal period during which the external steam flow was otherwise continuously maintained, without extending the conventional curing time for the article being cured, or measurably affecting the quality of the cure. Though the PLC has received less than 10% of the required number of cure equivalents for the cure when the shut-off is 75% early, and less than one-half when the shut-off is 25% early, the result is a saving of external steam which is correlatable to the net saving in time realized by the early shut-off. Early shut-off of the internal heating fluid, at a point in time of the internal heating cycle, sufficient to provide the PLC with the desired number of cure equivalents, also results in a saving of internal steam and/or water which is correlatable to the net saving in time realized by the early shut-off at that point.

It is a specific object of this invention to provide a process in which a preselected number of cure equivalents normally delivered to the PLC in a tire during a conventional cycle, is substantially unaffected, so long as the external steam flow is shut off for a period no longer than that during which the temperature swing, at a point 2 inches within the mold (measured from the mold's exterior surface), exceeds 10° F.

It is another specific object of this invention to avoid the expense of flowing steam continuously to the external surfaces of a mold in a dome press, and more particularly, to save at least 6 lb of steam for each minute of the external heating cycle during which the steam is shut off.

BRIEF DESCRIPTION OF THE DRAWINGS

The foregoing and other objects and advantages of my invention will appear more fully from the following description, made in connection with the accompanying drawings of a dome press in which the invention is practiced, in which drawings like reference characters refer to the same or similar parts throughout the views and in which:

FIG. 4 is a schematic illustration of the variation in surface temparature and of the variation in temperature amplitude at a depth x.

DETAILED DESCRIPTION OF PREFERRED EMBODIMENTS

In a preferred embodiment, this invention relates to a well-insulated dome press for curing tires, and to derive full benefit from the invention, requires a press having a 40" (inch) or larger cavity. A typical dome press having a cavity smaller than 40" is found to provide an inadequately large heated mass to provide the necessary "coasting" effect. The larger the mass, the larger the coasting effect. Thus dome presses having cavities in the range from 55" to 100" are particularly well-suited to benefit from this process.

With a dome press of adequate mass, an early shut-off of steam to the mold is not premature because it does not affect the quality of the cure. The steam may be shut off to the exterior of the mold alone, or to the interior of the tire being cured, or to both the interior and exterior, depending upon the size of the press and the curing conditions required, without substantially changing the number of cure equivalents delivered to the PLC within essentially the same period of time as if the shut-off was not early.

In each case the method of this invention relies on using the heated large mass of a dome press as a "heat sink" upon which unexpectedly great demands may successfully be made with the result that a net saving of heating fluid, typically steam and/or water, over the amount which would have been used without drawing on the heat sink, is realized. It also stems from the realization, derived from measurements of steam consumption during a cycle, that essentially all the steam required to effect the desired cure is usually flowed to the press before a normal press-open to press-close cycle is half-complete.

Figure 1:
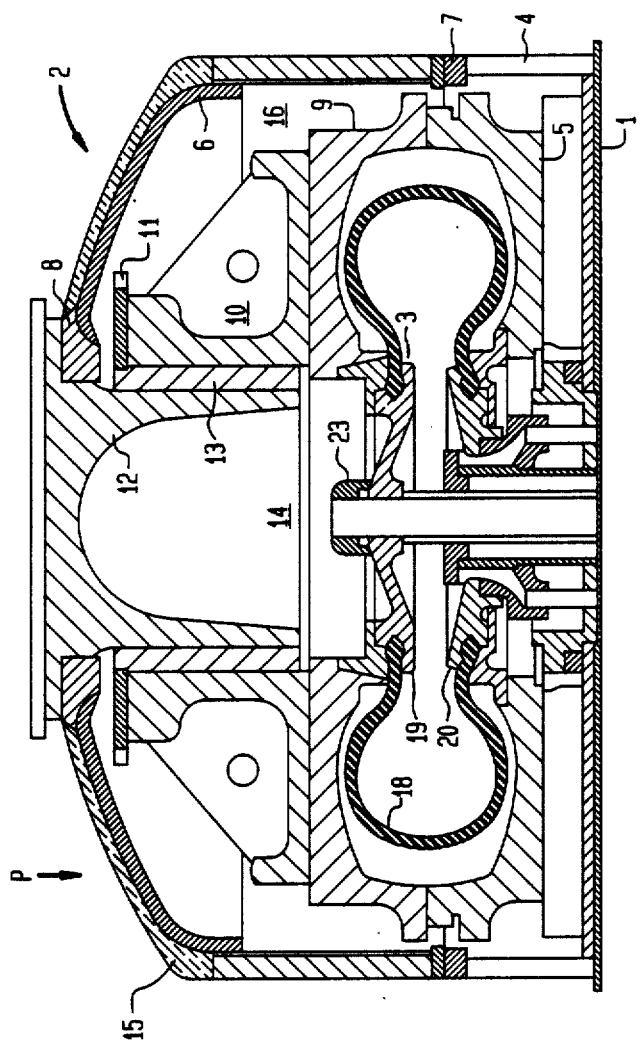
FIG. 1 is a partial side elevation broken away and shown in section, illustrating a conventional dome-press in which the molds are heated externally with high pressure steam, the dome curing press being in the closed position.

A better appreciation of why the method of this invention is so unexpectedly effective will be derived by reference to the accompanying drawing in which FIG. 1 shows a conventional dome press P. The press P comprises three main assemblies; the fixed press bottom assembly 1 at the bed of the press, the movable top assembly 2, and the diaphragm assembly 3 substantially as shown and described in U.S. Pat. No. 3,170,191 which is incorporated by reference thereto as if fully set forth herein.

The fixed bottom assembly 1 includes a lower casing 4 and a lower mold half 5, and the movable top assembly 2 includes an upper casing or steam dome 6 which forms a tight seal with the lower casing at 7, when the press P is closed. The dome 6 is welded to or otherwise fixedly attached to and supported by the cross head, or dome plate 8, which also supports all of the elements of the top assembly 2 located within steam dome 6. The dome plate 8 is rigidly attached to conventional operating mechanism, not shown, for raising lowering, and tilting the entire top assembly 2 of the press P. Such operating mechanism may, for example, be of the type disclosed in various Soderquist patents referred to hereinabove.

The upper mold half 9 is bolted to or otherwise fixedly connected to a webbed support member or bolster 10 which is ring-shaped, having an L-shaped radial cross-section (in an elevational view). The bolster 10 is adjustably supported on the dome plate 8 by means of a double-screw-threaded support 11 including a threaded annular central support 12 and an annular intermediate member 13 having its inner and outer surfaces threaded in opposite hands to mate with the threaded outer surface of the support 12 and the threaded inner surface of the bolster 10. A central chamber 14 of the top assembly 2, as defined by the central support 12 and associated parts, communicates through openings in the bolster with outer chamber 16 defined by the dome 6, the lower casing 4 and the interior components of the press. The dome is heavily insulated with insulation 15, as are all exterior surfaces through which economically significant heat loss would otherwise occur. The more effective the insulation, the less the loss of heat stored in the heat sink.

Figure 2:
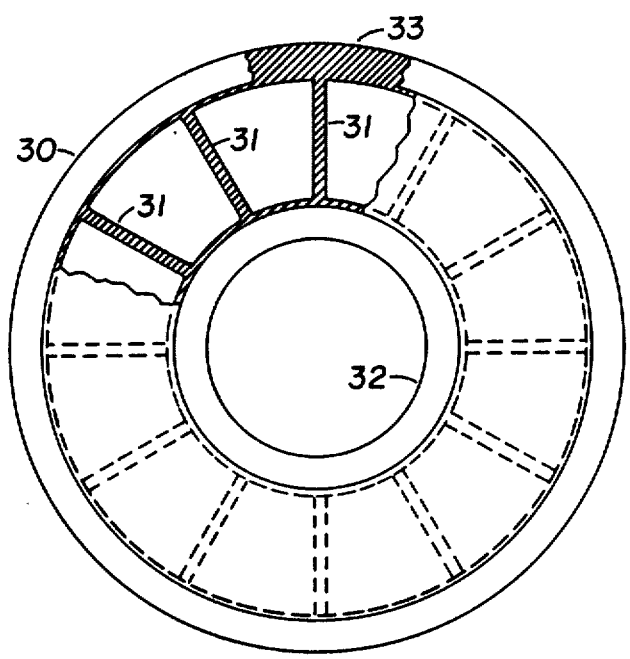
FIG. 2 is a plan view illustrating a tire mold assembly for the press of FIG. 1, which mold assembly rests on a spider through which the "external steam" is flowed to contact and heat the molds, and to pressurize the dome.

As seen in FIG. 2, the lower mold half rests on a "spider" 30 of twelve radial supporting bars 31 rigidly connected to inner and outer rings 32 and 33 respectively. The spider in turn is rigidly connected to the fixed lower portion of the press, all of which is standard construction in a dome press, and illustrated herein only to empashize the large mass involved. Steam introduced under the lower mold is quickly distributed to fill the entire unoccupied space within the dome. The flat upper and lower surfaces of the mold are held in place and clamped in position when the mold is closed for shaping and curing.

A top bead positioning ring is bolted to or otherwise fixedly attached to the upper mold half 9 and serves to engage and position the upper bead region of the tire carcass to be shaped and cured. In an analogous manner, a lower bead positioning ring is fixedly attached to the lower mold half 4 and serves to engage and position the lower bead region. These rings are not numbered in the diagram, as they are difficultly identified, are conventional, and as with the rest of the structural elements of the dome press, are only relevant to the invention because they contribute the necessary mass, and, therefore, heat storage capacity.

The two mold halves form a toroidal mold cavity having an inner shaping surface of predetermined configuration for shaping the carcass. Tread forming inserts are mounted in the mold halves to form the tread of the tire. Vent passages are provided in the mold halves to vent air from within the mold during the cure.

The diaphragm assembly 3 comprises a curing bladder or diaphragm 18, shown in solid outline as if biased against the inner surface of the interior of a tire carcass. The upper and lower edge portions of the diaphragm are gripped by the top and bottom diaphragm clamping rings 19 and 20 respectively. The various components of the diaphragm assembly 3 are all supported in known manner from a central shaft asembly 23 or other conventional means.

In normal operation of the press P, the top assembly 2 is closed and sealed with the bottom assembly 1, and then "internal" steam and/or hot water under pressure, is flowed into the bladder 18, through conduit means 24, first to shape the tire carcass in the mold into the toroidal form shown in FIG. 1, then to cure the tire from the inside. Soon after the internal steam is admitted, "external" steam is flowed into the chambers 14 and 16, filling them and heating the mold halves 5 and 9, and all other elements of the press within the dome. The steam temperature is preferably above about 270° F and flowed long enough to maintain the exterior surface of the mold above about 270° F. Typically high pressure steam will not exceed about 300 psig and the temperature of the steam will not exceed about 450° F. Condensate and steam are removed from within the dome by outlet passages extending radially through the spider and so arranged as not to permit condensate accumulation.

From calculations relating to temperature profiles within the mold, along with experimental determinations, it was found that a temperature swing of more than about 10° F produces an adverse effect on the cure which can be detected, as for example, by the blowpoint on a cured tire when it is destructively tested. This is evidence that an insufficient number of cure equivalents were delivered to the PLC resulting in porosity indicative of a lesser cure than desired.

To stay well within the prescribed 10° F swing, it is decided to permit only about a 5° F swing near a critical point within the mold. To do so, a point is chosen near the tire-mold interface. For a mold having a wall thickness of about 2.5" (inches), the point chosen is about 2" from the exterior surface.

The following calculations relate solely to the external steam-on cycle. The saving in internal steam/water on an early internal (within the tire) shut-off of the heating medium is, expectedly, relatively small even with an aggressively truncated internal heating cycle. This latter "internal-steam/water" saving may be determined by trial and error, using as a guide, the method of determination taught in copending patent application Ser. No. 102,956.

As will be seen from the calculation herebelow, the precise depth of the point within an aluminum mold will not have a significant effect because of the high conductivity of aluminum. The calculation for the temperature swing at the point 2" within the mold, is as follows:

Surface temperature oscillates around a mean temperature ($t_m$) according to the equation:

$$\theta_{0,\tau} = \theta_{0,a}\sin(2\pi n\tau)$$

where n = frequency or number of complete changes/unit time $\theta$ = temperature excess defined by $\theta = t - t_m$ The variation in surface temperature is schemtically illustrated in FIG. 4 by the solid sine curve indicated by the letter T; and, the variation in temperature amplitude at a distance x is denoted by the dashed sine curve indicated by the letter A. Temperature excess at any depth x and time $\tau$ can be expressed by:

$$\theta_{x,\tau} = \theta_{0,a} e^{-x\sqrt{\pi n/a}} \sin(2\pi n\tau - x\sqrt{\pi n/a}) \quad (1)$$

which is graphically represented as illustrated in FIG. 4. The time lag $$\Delta\tau = (x/2)\sqrt{1/a\pi n} \quad \theta_{x,\tau} = 0 \quad (2)$$

and, $$\theta_{x,a} = \theta_{0,a} e^{-x\sqrt{\pi n/a}} \text{ where } a = k/\rho\, C_p$$

where
K = conductivity
$\rho$ = density and, $C_p$ = heat capacity. For an aluminum mold, $$a = k/\rho\, C_p = 170/120 \times 0.23 = 6.16 \text{ ft}^2/\text{hr}$$

For an external "steam-on" cycle of 40 min, n = 1/0.666 = 1.50 and $\Delta\tau$ is computed to be less than 1 min which is small enough to be ignored.

$$\theta_{x,a} = \theta_{0,a} e^{-x\sqrt{\pi n/a}}$$
$$\theta = (316 - 310)/2 = 3° \text{ F.}$$
$$= 3e^{-0.167\sqrt{(1.50)/6.16}} = 2.59° \text{ F.}$$

Maximum mold temperature swing is therefore $2\theta_{x,a} = 5.18°$ F at a two inch depth within the mold.

As will be evident, this swing of 5.18° F is considerably less than the permissible 10.° F, thus affording highly conservative operation. Further usable latitude, but with progressively less degree of safety, is available, this further latitude being defined by the difference between a swing of 10° F and 5.18° F. To avail oneself of the maximum swing in temperature one can back-calculate the cycle time to get a cycle of minimum duration. With an automatic loading dome press, one can justify operating with a swing closer to 10° F than 5° F, without having to accept an increased risk of under-curing the tire.

EXAMPLE

A 60" Auto-Form Dome Curing Press for heavy duty truck tires was instrumented to measure steam flow, using orifice-type flow meters which work on a pressure differential principle. The orifice flow meters were mounted in a calibrated section of close-tolerance I.D. (inside diameter) pipe, and installed on the inlet side of the high pressure internal, the external dome, and shaping steam lines. All three meters were mounted in vertical pipe runs to avoid condensate from damming upstream of the orifice plates.

Because the initial flow of steam during the curing cycle is much higher than it is later in the cycle (during 'fill'), two sizes of orifice plates are used to maintain the desired accuracy over the entire flow range. The larger orifice is used to measure initial flow (surge) over the first about one minute, and the smaller plate is used for the lower flow.

Thermocouples are installed to measure both the inlet and outlet temperature on both sides of the press. A common inlet and individual cavity outlet dome temperature were also measured. In all instances the temperature of the mold is at least 300° F. A lower mold temperature in the range from about 250° F to 300° F may be used, but the external steam-on cycle is extended so much as to become progressively less economical as the mold temperature is decreased. Pressures measured included an inlet pressure for each internal, and a common outlet pressure for the domes.

The data is recorded on a Hewlett Packard Data Logger, a computer with disk storage, and it was visually monitored on a CRT (cathode ray tube). The data logger is able to scan and record all points monitored every 10 sec. The recorded steam flow data were then plotted. The press cycle data, for the purpose at hand, ended for the prior cycle and began for the next cycle when shaping steam first begins to flow into the tire.

A conventional time between "press-open" and "press-close" is about 45 min. The external steam cure cycle for the 9.00×20, T165A HD tire was 40 min; the internal cure cycle is about 43 min, not including about 2 min for blowdown. The internal medium used was 200 psig steam at 388° F. The temperature of the external surface of the mold when steam is on, is 316° F.

The external steam to the dome is first shut-off 5 min early after the first curing cycle; each cycle is repeated three times to obtain a measurement; then, for each successive curing cycle, each of which is also repeated three times, the steam is shut-off 5 min earlier, so that the sixteenth, seventeenth and eighteenth tires cured had the steam shut off 30 min earlier than in the conventional 40min external steam-on cycle.

It is apparent that in each case, the steam is shutoff before the PLC receives a predetermined number of cure equivalents, but there is no noticeable reduction in quality of the cure. Thus, depending upon the degree of safety one wishes to build into the curing cycle, the size of the dome press, and how well it is insulated, inter alia, from about 25% to about 75% of the steam conventionally utilized in an external "steam on" cycle may be saved. In this particular press, a time reduction of each 5 min period reduced steam consumption by 40 lb/hr. The amount of steam saved is correlatable to the net saving in time realized by the early shut-off.

Figure 3:
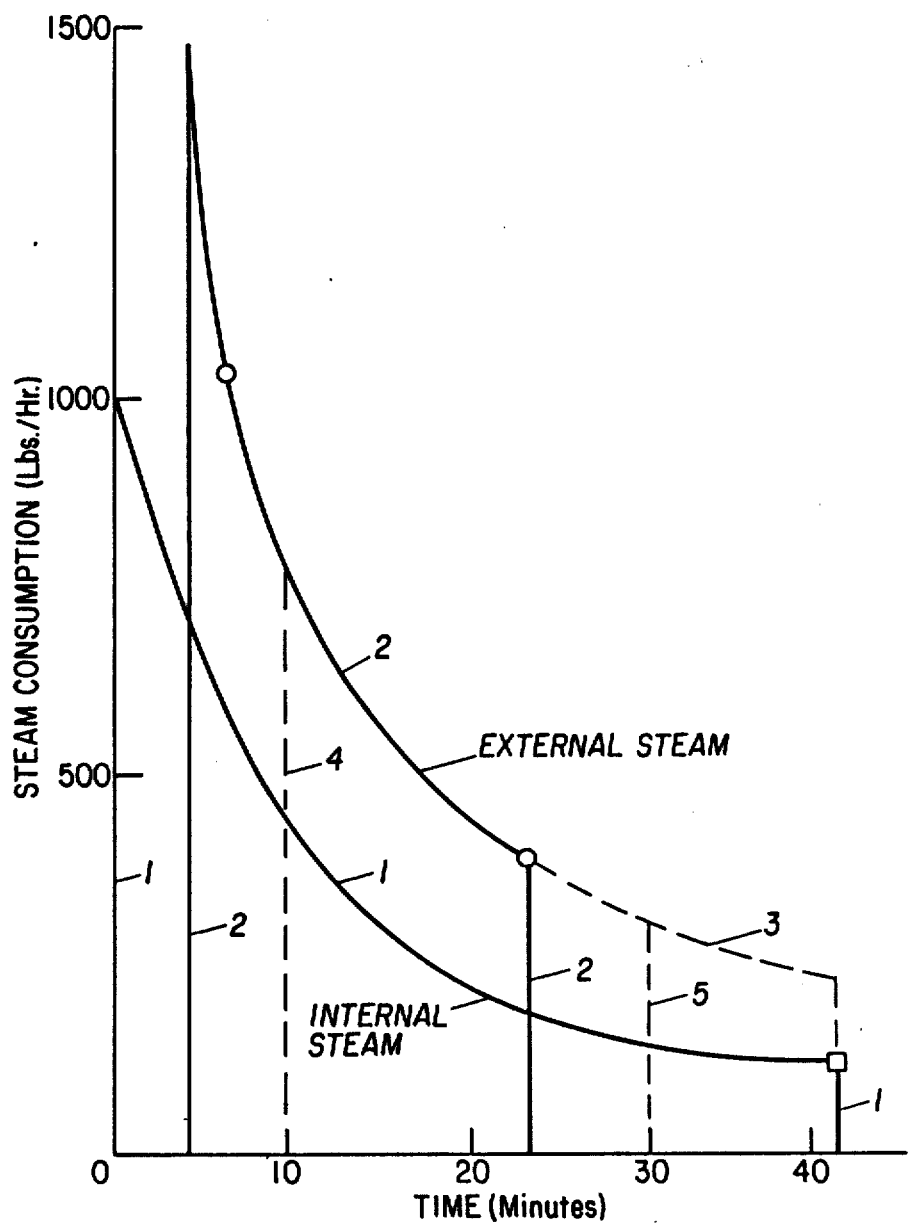
FIG. 3 is a schematic representation of a strip chart, not to scale, recording the flow of internal steam to the bladder (when only steam is used as the internal heating fluid), and, the flow of external steam to the dome, visually demonstrating the surprisingly high rate at which the steam surges into the bladder and dome, respectively, at the beginning of both the internal and external steam heating cycles, and how quickly the flow rate diminishes.

Referring to FIG. 3 there is shown a graph for actual external and internal steam flow to the press during a typical cycle in which only steam is used as the heating medium. It will be appreciated that internal heat may more economically provided by commencing the internal cycle with steam, switching to water, then reverting to steam, and variations thereof. In each case, one will estimate the allowable early shut-off of the internal heating fluid by trial and error, recognizing that the shut-off will not be more than about 60% early, that is, before 40% of the internal heating, cycle is completed.

In FIG. 3, time "zero" indicates the moment when the press closes and shaping steam has been discontinued. The flow of internal steam is recorded by the curve and vertical portions at the ends thereof, together identified by reference numeral 1. It is seen that steam flow surges in at an initial rate of about 1000 lb/hr, then drops off until it is shut-off at the end of about a 43 min cycle. The flow of external steam is recorded by the curve and vertical portions at the ends thereof, together identified by reference numeral 2. It is seen that steam flow surges in at an initial rate of about 1500 lb/hr, then drops off until flow is shut-off after about 23 min. The normal external cycle would have continued to 40 min. The savings of time corresponds to the length of the axis under dashed curve 3. The saving of steam corresponds to the area under the dashed curve 3.

In the particular curing cycle for the tire of this example, it is seen from curve 1, that a significant saving of external steam will be realized if the steam is shut off as late as when 75% of the external steam-on cycle time has elapsed. This saving is indicated by the area under the dashed curve 3 within the time period from 30 to 40 min. Obviously, an even later shut-off will provide some saving, but will generally not be effected when a much larger saving is possible with very little risk.

A maximum external steam saving will be realized if the steam is shut off as early as when only 25% of the external steam-on cycle time has elapsed. This saving is indicated by the area under a portion of the solid line curve 2, and the dashed curve 3, within the time period from 10 to 40 min, bounded by the dashed vertical lines identified by reference numerals 4 and 5.

Though not shown in FIG. 4, in an analogous manner, a saving in steam will be effected corresponding to the area under the curve 1, within the time period from early shutoff, until the end of the normal internal steam-on cycle. As will be evident from a comparison of the areas under appropriate portions of the curves 1 and 2, which portions coresspond to the respective early shut-offs, the saving of steam with early shut-off of internal steam is small relative to that of external steam.

Having thus provided a general discussion, and a specific illustration of the best mode of operation of a conventional dome press, and described the manner in which substantial savings of heating fluid, and particularly steam, may be realized by an early shut-off of flow of the heating fluid to either the external surfaces of the mold, or to the internal surfaces of the article being cured in the mold's cavity, or both, with a predetermined degree of risk, and without substantially affecting the conventional press cycle for curing the same article in the same press, it is to be understood that no undue restrictions are to be imposed by reason thereof, except as provided by the following claims.

I claim:

1. In a process for shaping and curing a green article in a dome press using high pressure external steam to heat a mold in the press, by flowing said steam externally over said mold, placing said green article in a cavity defined by upper and lower halves of said mold, heating said article internally with an internal heating medium flowed through a bladder, and externally with steam flowed over said mold, so that, when the press is opened, the point of least cure has received the required number of cure equivalents to complete curing said article, the improvement comprising,
   (a) flowing said external steam for long enough to maintain the external surface of said mold at above about 270° F,
   (b) shutting off the flow of said steam early, before said point of least cure has received one-half of said required number of cure equivalents, early shut-off occurring after about 25%, and before about 75%, of a normal external steam-on cycle time is over, during which cycle the external steam flow would have continuously been maintained; said early shut-off also occurring at a time such that a temperature swing of 10° F at a location within said mold near an interface of said article and an article surface-forming portion of said mold is not exceeded; yet,
   (c) delivering substantially the same required number of cure equivalents to said point of least cure as delivered during a normal external steam-on cycle without extending the press-close to press-open time which would have been required for a normal external steam-on cycle, and without monitoring the temperature at any point within said article; whereby the amount of steam saved by said early shut-off is correlatable to the time during which said steam is shut-off early.

2. The process of claim 1 wherein said green article is a green tire and said press having a cavity at least about 40 inches in diameter.

3. The process of claim 1 wherein said location is about 2 inches within said mold.

* * * * *